United States Patent
Weber et al.

(10) Patent No.: US 6,894,112 B1
(45) Date of Patent: May 17, 2005

(54) THERMALLY STABLE POLYESTER MOLDING MATERIALS

(75) Inventors: Martin Weber, Maikammer (DE); Walter Heckmann, Weinheim (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/129,979

(22) PCT Filed: Nov. 10, 2000

(86) PCT No.: PCT/EP00/11101
§ 371 (c)(1),
(2), (4) Date: May 13, 2002

(87) PCT Pub. No.: WO01/38436
PCT Pub. Date: May 31, 2001

(30) Foreign Application Priority Data

Nov. 24, 1999 (DE) .......................... 199 56 539

(51) Int. Cl.⁷ .............................................. C08L 51/04
(52) U.S. Cl. .............................. 525/65; 525/67; 525/69
(58) Field of Search ............................. 525/65, 67, 69

(56) References Cited

U.S. PATENT DOCUMENTS

| | | |
|---|---|---|
| 4,522,797 A | 6/1985 | Pettigrew |
| 4,629,760 A | 12/1986 | Liu |
| 4,652,607 A | 3/1987 | Stix |
| 4,694,042 A | 9/1987 | McKee |
| 4,764,556 A | 8/1988 | Lausberg |
| 4,879,324 A | 11/1989 | Lausberg |
| 4,897,448 A | 1/1990 | Romance |
| 4,939,201 A | 7/1990 | Seiler |
| 4,940,746 A | 7/1990 | Lausberg |
| 4,968,731 A | 11/1990 | Lausberg |
| 5,112,913 A | 5/1992 | Horiuchi |
| 5,187,227 A * | 2/1993 | Tera et al. .................... 525/65 |
| 5,412,028 A | 5/1995 | Yeo |

FOREIGN PATENT DOCUMENTS

| | | |
|---|---|---|
| DE | 37 33 839 | 4/1989 |
| WO | 92/14787 | 9/1992 |

* cited by examiner

*Primary Examiner*—Jeffrey Mullis
(74) *Attorney, Agent, or Firm*—Novak, Druce, DeLuca & Quigg

(57) ABSTRACT

The invention relates to thermoplastic molding materials containing the following main components: A) 2 to 97.9 wt. % of at least one polyester; B) 0 to 95.9 wt. % of at least one polycarbonate; C) 1 to 80 wt. % of at least one graft polymer which is made up of $c_1$) 40 to 80 wt. % of a graft base consisting of a rubber elastic polymer based on alkyl acrylates with 1 to 8 C-atoms in the alkyl radical and with a glass transition temperature of less than 10° C., $c_2$) 20 to 60 wt. % of a graft support consisting of $c_{21}$) 60 to 95 wt. % styrene or substituted styrenes of general formula (I), wherein R represents an alkyl radical with 1 to 8 C-atoms or a hydrogen atoms and $R^1$ represents an alcohol radical with 1 to 8 C-atoms and the value of n is 1, 2 or 3 and $c_{22}$) 5 to 40 wt. % of at least one unsaturated nitrile; D) 1 to 80 wt. % of a copolymer consisting of $d_1$) 60 to 95 % styrene or substituted styrenes of general formula (I) or mixtures thereof and $d_2$) 5 to 40 wt. % of at least one unsaturated nitrile; E) 0.1 to 10 wt. % of an epoxyde resin; and F) 0 to 80 wt. % other additives, the sum of the weight percentages of components A) to F) being 100%.

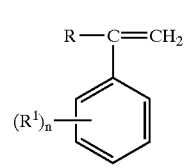

(I)

10 Claims, No Drawings

THERMALLY STABLE POLYESTER MOLDING MATERIALS

The invention relates to thermoplastic molding compositions comprising, as substantial components, A) from 2 to 97.9% by weight of at least one polyester B) from 0 to 95.9% by weight of at least one polycarbonate C) from 1 to 80% by weight of at least one graft polymer built up from
  $c_1$) from 40 to 80% by weight of a graft base made from an elastomeric polymer based on alkyl acrylates having from 1 to 8 carbon atoms in the alkyl radical and with a glass transition temperature below 10° C.,
  $c_2$) from 20 to 60% by weight of a graft made from
  $c_{21}$) from 60 to 95% by weight of styrene or substituted styrenes of the formula I

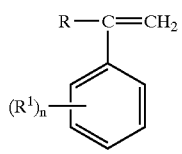

I where R is alkyl having from 1 to 8 carbon atoms or hydrogen and $R^1$ is alkyl having from 1 to 8 carbon atoms and n is 1, 2 or 3, and
  $c_{22}$) from 5 to 40% by weight of at least one unsaturated nitrile, D) from 1 to 80% by weight of a copolymer made from
  $d_1$) from 60 to 95% by weight of styrene or of substituted styrenes of the formula I or mixtures of these, and
  $d_2$) from 5 to 40% by weight of at least one unsaturated nitrile, E) from 0.1 to 10% by weight of an epoxy resin, and F) from 0 to 80% by weight of other additives, where the total of the percentages by weight of components A) to F) is 100%.

The invention further relates to the use of the novel molding compositions for producing moldings of any type, and to the resultant moldings.

Industry is increasingly interested in polymer mixtures, since they can provide tailored combinations of properties. Of particular interest here are polymer mixtures made from incompatible polymers which have unusual combinations of properties.

Polymer mixtures based on polyesters and on polycarbonates have been known for some years (U.S. Pat. Nos. 4,522,797, 4,764,556, 4,897,448, EP-A 180 648, DE-A 3302124). The industrially important products also comprise impact modifiers to improve toughness, in particular at low temperatures, and those preferably used are MBS modifiers, acrylate graft rubbers and ethylene copolymers with polar comonomers.

Blends based on polyesters and on styrene copolymers are likewise known (DE-A 3403 576, EP-A 310 976, EP-A 310 977, EP-A 310 978). DE-A 3733 839 moreover discloses mixtures made from polyesters and from at least two rubbers of different particle size, featuring good toughness.

For many applications there is still a requirement for polymer mixtures based on polyesters and on polycarbonate or, respectively, on styrene copolymers, having good toughness, high dimensional stability and good stability in long-term service.

It is an object of the present invention to provide polyester molding compositions which have improved mechanical properties (in particular toughness) and stability and long-term service.

We have found that this object is achieved by the molding compositions defined at the outset. Preferred embodiments are given in the subclaims.

Surprisingly, it has now been found that the thermoplastic molding compositions mentioned at the outset, which comprise epoxy resins as a substantial constituent, have a property profile which is improved over the prior art in relation to toughness and stability in long-term service.

The novel molding compositions comprise, as component (A), from 2 to 97.9% by weight, preferably from 5 to 90.8% by weight and in particular from 10 to 81.5% by weight, of a thermoplastic polyester.

Use is generally made of polyesters A) based on aromatic dicarboxylic acids and on an aliphatic or aromatic dihydroxy compound.

A first group of preferred polyesters is that of polyalkylene terephthalates having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution of the aromatic ring, e.g. by halogen, such as chlorine or bromine, or by $C_1$–$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in a 0.5% strength by weight solution in a phenol/o-dichlorobenzene mixture in a weight ratio of 1:1 at 25° C. in accordance with ISO 1628.

Particular preference is given to polyesters whose carboxyl end group content is up to 100 mval/kg, preferably up to 50 mval/kg and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters which are different from PBT, for example polyethylene terephthalate (PET). The proportion e.g. of the polyethylene terephthalate in the mixture is preferably up to 50% by weight, in particular from 10 to 30% by weight, based on 100% by weight of A).

It is also advantageous to use recycled PET materials (also termed scrap PET), if desired in a mixture with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are isolated and purified and then melted and pelletized using an extruder. This usually facilitates handling and free flow, and metering for further steps in processing.

The recycled materials used may either be pelletized or in the form of regrind. The edge length should not be more than 6 mm, preferably less than 5 mm.

Because polyesters undergo hydrolytic cleavage during processing (due to traces of moisture) it is advisable to predry the recycled material. The residual moisture after drying is preferably from 0.01 to 0.7%, in particular from 0.2 to 0.6%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

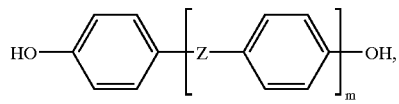

where Z is alkylene or cycloalkylene having up to 8 carbon atoms, arylene having up to 12 carbon atoms, carbonyl, sulfonyl, oxygen or sulfur, or a chemical bond, and m is from 0 to 2. The phenylene groups of the compounds I may also have substitution by $C_1$–$C_6$-alkyl or alkoxy and fluorine, chlorine or bromine.

Examples of parent substances for these compounds are
dihydroxydiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene resorcinol and
hydroquinone and also the ring-alkylated and ring-halogenated derivatives of these.

Among these, preference is given to
4,4'-dihydroxydiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenylsulfone and
2,2-di(3',5'-dimethyl-4'-hydroxyphenyl)propane
or mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, the molding compositions may comprise, as component B), from 0 to 95.9% by weight, preferably from 5 to 90.8% by weight and in particular from 10 to 81.5% by eight, of at least one polycarbonate.

Halogen-free polycarbonates are preferably used as component B). Examples of suitable halogen-free polycarbonates are those based on biphenols of the formula

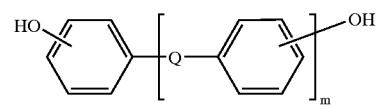

where Q is a single bond, $C_1$–$C_8$-alkylene, $C_2$–$C_3$-alkylidene, $C_3$–$C_6$-cycloalkylidene, $C_6$–$C_{12}$-arylene, or also, —O—, —S— or —SO$_2$—, and m is an integer from 0 to 2.

The phenylene radicals of the biphenols may also have substituents, such as $C_1$–$C_6$-alkyl or $C_1$–$C_6$-alkoxy.

Examples of preferred biphenols of this formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component B, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight-average) of from 10,000 to 200,000 g/mol, preferably from 20,000 to 80,000 g/mol.

The biphenols of this formula are known per se or can be prepared by known processes.

The polycarbonates may, for example, be prepared by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782).

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A 35 06 472, such as p-nonylphenyl, 3,5-di-tert-butylphenol, p-tert-octylphenol, p-dodecylphenol, 2-(3,5-dimethylheptyl) phenol and 4-(3,5-dimethylheptyl)phenol.

For the purposes of the present invention, halogen-free polycarbonates are polycarbonates made from halogen-free biphenols, from halogen-free chain terminators and, if desired, from halogen-free branching agents, where the content of subordinate amounts of hydrolyzable chlorine at the ppm level, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components B) which may be mentioned are amorphous polyester carbonates, where phosgene has been replaced by aromatic dicarboxylic acid units, such as isophthalic acid and/or terephthalic acid units, during the preparation. For further details reference may be made at this point to EP-A 711,810.

EP-A 365 916 describes other suitable copolycarbonates having cycloalkyl monomer units.

It is also possible to replace bisphenol A with bisphenol TMC. Polycarbonates of this type are commercially available from Bayer with the trademark APEC HT®.

The novel molding compositions use, as component C), from 1 to 80% by weight, based on the total of components A to F, of a graft copolymer or of a mixture of different graft copolymers. Preferred novel molding compositions comprise from 2 to 60% by weight, particularly preferably from 5 to 50% by weight, of at least one graft copolymer C) which differs from elastomeric polymers F).

The graft polymers C) have been built up from $c_1$) from 40 to 80% by weight, preferably from 50 to 70% by weight, of a graft made from an elastomeric polymer based on alkyl acrylates having from 1 to 8 carbon atoms in the alkyl radical and with a glass transition temperature below 0° C., and $c_2$) from 20 to 60% by weight, preferably from 30 to 50% by weight, of a graft made from $C_{21}$) from 60 to 95% by weight, preferably from 70 to 85% by weight, of styrene or of substituted styrenes of the formula I

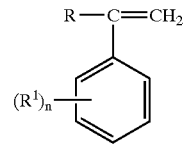

where R is $C_1$–$C_8$ alkyl, preferably methyl or ethyl, or hydrogen and $R^1$ is $C_1$–$C_8$-alkyl, preferably methyl or ethyl, and n is 1, 2 or 3, or mixtures of these, and $c_{22}$) from 5 to 40% by weight, preferably from 15 to 30% by weight, of at least one unsaturated nitrile, preferably acrylonitrile or methacrylonitrile or mixtures of these.

Possible polymers for the graft base $c_1$ are those whose glass transition temperature is below 10° C., preferably below 0° C., particularly preferably below −20° C. Examples of these are elastomers based on $C_1$–$C_8$-alkyl acrylates, which may, if desired, contain other comonomers.

Preference is given to graft bases $c_1$ which have been built up from $c_{11}$) from 70 to 99.9% by weight, preferably 99% by weight, of at least one alkyl acrylate having from 1 to 8 carbon atoms in the alkyl radical, preferably n-butyl acrylate and/or 2-ethylhexyl acrylate, in particular n-butyl acrylate as sole alkyl acrylate, $c_{12}$) from 0 to 30% by weight, in particular from 20 to 30% by weight, and of another copolymerizable mono-ethylenically unsaturated monomer, such as butadiene, isoprene, styrene, acrylonitrile, methyl methacrylate or vinyl methyl ether or a mixture of these, $c_{13}$) from 0.1 to 5% by weight, preferably from 1 to 4% by weight, of a compolymerizable polyfunctional, preferably bi- or trifunctional, monomer which brings about crosslinking.

Suitable bi- or polyfunctional crosslinking monomers $c_{13}$) are those which preferably contain two, or if desired three or more, ethylenic double bonds capable of copolymerization but not 1,3-conjugated. Examples of suitable crosslinking monomers are divinylbenzene, diallyl maleate, diallyl fumarate, diallyl phthalate, triallyl cyanurate and triallyl isocyanurate. A crosslinking monomer which has proven particularly advantageous is tricyclodecenyl acrylate (cf. DE-A 12 60 135).

This type of graft base is known per se and is described in the literature, for example in DE-A 31 49 358.

Preferred grafts $C_2$ are those in which $c_{21}$ is styrene or α-methylstyrene or a mixture of these and in which $C_{22}$ is acrylonitrile or methacrylonitrile. Especially preferred monomer mixtures are styrene and acrylonitrile or α-methylstyrene and acrylonitrile. The grafts are obtainable by compolymerizing components $c_{21}$ and $C_{22}$.

The graft base $c_1$ of the graft polymers C) is also termed an ASA rubber and has been built up from components $c_{11}$, $c_{12}$ if desired and $c_{13}$. Its preparation is known per se and is described in DE-A 28 26 925, DE-A 31 49 35B and DE-A 3414 118, by way of example.

The graft polymers C) may, for example, be prepared by the method described in DE-C 12 60 135.

The graft (graft envelope) of the graft polymers may be built up in one or two stages.

If the graft envelope is built up in one stage, a mixture of the monomers $C_{21}$ and $C_{22}$ in the desired ratio by weight of from 95:5 to 50:50, preferably from 90:10 to 65:35, is polymerized, preferably in emulsion, in the presence of the elastomer $c_1$, in a manner known per se (cf., for example, DE-A 28 26 925).

If the graft envelope $c_2$ is built up in two stages, the first stage generally makes up from 20 to 70% by weight, preferably from 25 to 50% by weight, based on $C_2$. It is preferably prepared using only styrene or substituted styrenes or mixtures of these ($C_{21}$).

The second stage of the graft envelope generally makes up from 30 to 80% by weight, in particular from 50 to 75% by weight, based in each case on $c_2$. This preparation utilizes mixtures made from the monomers $c_{21}$ and from the nitrites $c_{22}$ generally in a weight ratio $C_{21}/C_{22}$ of from 90:10 to 60:40, in particular from 80:20 to 70:30.

The conditions for the graft polymerization are preferably selected to give particle sizes of from 50 to 700 nm ($d_{50}$ of the integral mass distribution). Measures to this end are known and are described in DE-A 2826925, for example.

A coarse-particle rubber dispersion may be prepared directly via the seed-latex process.

To obtain very tough products it is frequently advantageous to use a mixture of at least two graft polymers with different particle sizes.

To achieve this, the particles of the rubber are enlarged in a known manner, e.g. by agglomeration, so that the latex has a bimodal structure (from 50 to 180 nm and from 200 to 700 nm).

The preferred embodiment uses a mixture made from two graft polymers with particle diameters ($d_{50}$ of the integral mass distribution) of from 50 to 180 nm and, respectively, from 200 to 700 nm in a weight ratio of from 70:30 to 30:70.

The chemical structure of the two graft polymers is preferably the same, but the envelope of the coarse-particle graft polymer may in particular have a two-stage structure.

Mixtures made from component A and C, where the latter has a coarse-particle and a fine-particle graft polymer, are described in DE-A 36 15 607, for example. Mixtures made from components A and C, where the latter has a two-stage graft envelope, are known from EP-A 111 260.

The novel molding compositions comprise, as component D, from 1 to 80% by weight, based on the total of components A to F, of at least one copolymer based on styrene or on substituted styrenes and on unsaturated nitrites. Preferred novel molding compositions comprise, based on the total of components A to F, from 2 to 60% by weight, in particular from 3 to 50% by weight, of component D.

According to the invention, copolymers D have been built up from $d_1$) from 60 to 95% by weight, preferably from 70 to 85% by weight, of styrene or of substituted styrenes of the formula I or mixtures of these, and $d_2$) from 5 to 40% by weight, preferably from 15 to 30% by weight, of at least one unsaturated nitrile, preferably acrylonitrile or methacrylonitrile or mixtures of these.

The copolymers D are resin-like, thermoplastic and rubber-free. Particularly preferred copolymers D are those made from styrene or acrylonitrile, from α-methylstyrene and acrylonitrile or from styrene, α-methylstyrene and acrylonitrile. It is also possible for two or more of the copolymers described to be used simultaneously.

The copolymers D are known per se and may be prepared by free-radical polymerization, in particular by emulsion, suspension, solution or bulk polymerization. They have viscosity numbers of from 40 to 160, corresponding to average molecular weights $M_w$ (weight average) of from 40,000 to 2,000,000.

The novel molding compositions comprise, as component E, from 0.01 to 10% by weight, preferably from 0.2 to 5% by weight and in particular from 0.5 to 3% by weight, of an epoxy resin. B. Ellis, Chemistry and Technology of Epoxy-Resins, Blackie Academic & Professional, 1993, describes the structure and preparation of epoxy resins, and any of these are in principle suitable.

Preferred epoxy resins have the formula II and are usually obtainable by condensing 2,2-bis(p-hydroxyphenylpropane) (bisphenol A) and epichlorohydrin:

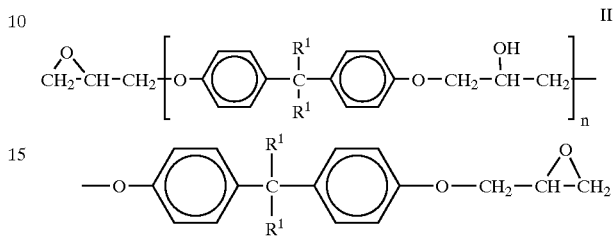

where
$R^1$ is hydrogen or alkyl having from 1 to 16 carbon atoms, preferably methyl, and
n is from 2 to 50, preferably from 2 to 13.

Epoxy resins usually have an epoxy number to ISO 3001 of from 1.5 to 1.9, preferably from 1.68 to 1.75. The softening point to DIN 51920 is preferably from 75 to 100° C., preferably from 82 to 90° C. The melt viscosity to DIN 53018 Part 1 at 175° C. is preferably from 250 to 600 mPas, in particular from 350 to 480 mPas.

Other preferred epoxy resins have the formula III

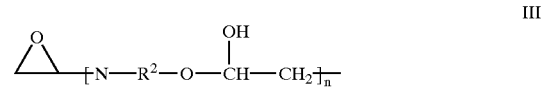

where n is as defined for II and $R^2$ is alkyl having from 1 to 16 carbon atoms.

Preferred $R^2$ are propyl and butyl.

Other suitable expoxy resins have the formula IV

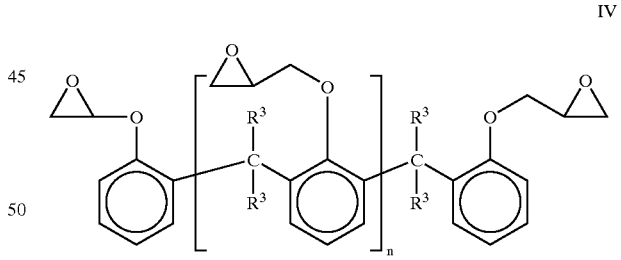

where $R^3$ and n are as defined for formula II, and $R^3$ is preferably hydrogen.

Cycloaliphatic epoxy resins (formula V) are also suitable:

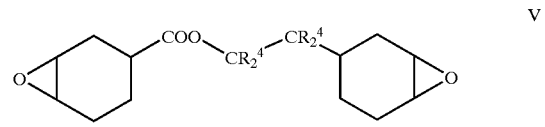

where $R^4$ is alkyl having from 1 to 16 carbon atoms. Other preferred resins are condensation products of alcohols, in particular of diols and/or of bisphenols with triglycidyl isocyanurate.

It is, of course, also possible to use mixtures, and the mixing ratio may be as desired.

The novel molding compositions comprise, as component F), from 0 to 80% by weight, in particular up to 50% by weight, of other additives.

The novel molding compositions may comprise, as component F), from 0 to 5%, in particular from 0.01 to 5% by weight, preferably from 0.05 to 3% by weight and particularly from 0.1 to 2% by weight, of at least one ester or amide of saturated or unsaturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms.

The carboxylic acids may be mono- or dibasic. Examples are pelargonic acid, palmitic acid, lauric acid, margaric acid, dodecanedioc acid, behenic acid and, particularly preferably, stearic acid, capric acid and montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol and pentaerythritol. Glycerol and pentaerythritol are preferred.

The aliphatic amines may be mono- to tribasic. Examples of these are stearylamine, ethylenediamine, propylenediamine, hexamethylenediamine and di(6-aminohexyl) amine. Ethylenediamine and hexamethylenediamine are particularly preferred. Correspondingly, preferred esters or amides are glycerol distearate, glycerol tristearate, ethylenediamine distearate, glycerol monopalmitate, glycerol trilaurate, glycerol monobehenate and pentaerythritol tetrastearate.

It is also possible to use mixtures of different esters or amides or combinations of esters with amides. The mixing ratio may be as desired.

Examples of other additives F) are up to 40% by weight, preferably up to 30% by weight, of elastomeric polymers (also frequently termed impact modifiers, elastomers or rubbers) which differ from C).

These are very generally copolymers preferably built up from at least two of the following monomers: ethylene, propylene, butadiene, isobutene, isoprene, chloroprene, vinyl acetate, styrene, acrylonitrile and (meth)acrylates having from 1 to 18 carbon atoms in the alcohol component.

Polymers of this type have been described, for example, in Houben-Weyl, Methoden der organischen Chemie, Vol. 14/1 (Georg-Thieme-Verlag, Stuttgart, 1961), pages 392–406, and in the monograph by C. B. Bucknall, "Toughened Plastics" (Applied Science Publishers, London, 1977). Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These monomers containing dicarboxylic acid derivatives or containing epoxy groups are preferably incorporated into the rubber by adding to the monomer mixture monomers containing dicarboxylic acid groups and/or epoxy groups and having the formula I, II, III or IV

$$R^1C(COOR^2)=C(COOR^3)R^4 \qquad (I)$$

(II)

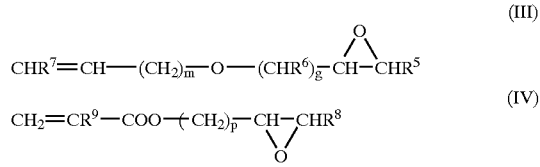

(III)

(IV)

where $R^1$ to $R^9$ are hydrogen or alkyl having from 1 to 6 carbon atoms, and m is an integer from 0 to 20, g is an integer from 0 to 10 and p is an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate.

Although the latter have no free carboxyl groups their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers composed of
 from 50 to 98% by weight, in particular from 55 to 95% by weight, of ethylene,
 from 0.1 to 40% by weight, in particular from 0.3 to 20% by weight, of glycidyl acrylate and/or glycidyl methacrylate, (meth)acrylic acid and/or maleic anhydride, and
 from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

It is, of course, also possible to use mixtures of the types of rubber listed above.

Examples of fibrous or particulate fillers are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, and in particular from 1 to 40% by weight, particularly from 20 to 35% by weight.

Preferred fibrous fillers are carbon fibers, aramid fibers and potassium titanate fibers, and particular preference is given to glass fibers in the form of E glass. These may be used as rovings or chopped glass in the commercially available forms.

The fibrous fillers may have been surface-pretreated with a silane compound to improve compatibility with the thermoplastic.

Suitable silane compounds have the formula

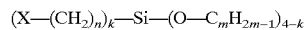

where: x $NH_2$—,

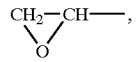

n is an integer from 2 to 10, preferably 3 or 4
m is an integer from 1 to 5, preferably 1 or 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which contain a glycidyl group as substituent X.

The amounts of the silane compounds generally used for surface-coating are from 0.05 to 5% by weight, preferably from 0.5 to 1.5% by weight and in particular from 0.8 to 1% by weight (based on F).

Acicular mineral fillers are also suitable.

For the purposes of the invention, acicular mineral fillers are mineral fillers with strongly developed acicular character. An example which may be mentioned is acicular wollastonite. The mineral preferably has an L/D (length to diameter) ratio of from 8:1 to 35:1, preferably from 8:1 to 11:1. The mineral filler may, if desired, have been pretreated with the abovementioned silane compounds, but the pretreatment is not essential.

Other fillers which may be mentioned are kaolin, calcined kaolin, wollastonite, talc and chalk.

The novel thermoplastic molding compositions may comprise, as component F), conventional processing aids, such as stabilizers, oxidation retarders, agents to counter thermal decomposition and decomposition by ultraviolet light, lubricants, mold-release agents, colorants, such as dyes and pigments, flame retardants, nucleating agents, plasticizers, etc.

UV stabilizers which should be mentioned and are usually used in amounts of up to 2% by weight, based on the molding composition, are various substituted resorcinols, salicylates, benzotriazoles and benzophenones.

Colorants which may be added are inorganic pigments, such as ultramarine blue, iron oxide and carbon black, and also organic pigments, such as phthalocyanines, quinacridones and perylenes, and also dyes, such as nigrosine and anthraquinones.

Nucleating agents which may be used are sodium phenylphosphinate, aluminum oxide, silicon dioxide and also preferably talc.

Other lubricants and mold-release agents, of which up to 1% by weight is usually used, are preferably long-chain fatty acids (e.g. stearic acid or behenic acid), salts of these (e.g. Ca stearate or Zn stearate) or montan waxes (mixtures of straight-chain saturated carboxylic acids with chain lengths of from 28 to 32 carbon atoms), or also low-molecular-weight polyethylene waxes or low-molecular-weight polypropylene waxes.

Examples of plasticizers which should be mentioned are dioctyl phthalates, dibenzyl phthalates, butyl benzyl phthalates, hydrocarbon oils and N-(n-butyl) benzenesulfonamide.

The novel molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley, 1952, pp. 484 to 494 and by Wall in "Fluoropolymers" (Wiley Interscience, 1972).

These fluorine-containing ethylene polymers have homogeneous distribution in the molding compositions and preferably have a particle size $d_{50}$ (number average) in the range from 0.05 to 10 µm, in particular from 0.1 to 5 µm. These small particle sizes may particularly preferably be achieved by using aqueous dispersions of fluorine-containing ethylene polymers and incorporating these into a polyester melt.

Another preferred group of lubricants is that of ethylene oxide-propylene oxide copolymers.

The ethylene oxide-propylene oxide copolymers are generally prepared by ionic polymerization, and the preparation is described in N. Schönfeldt, Grenzflächenaktive Ethylenoxid-Addukte, Wissenschaftliche Verlagsgesellschaft mbh, Stuttgart 1976, pp. 53 et seq. To prepare the X—Y—X copolymers, a medial polypropylene oxide block Y is usually polymerized first, and a block made from ethylene oxide units is attached at the two ends of the same. The molar masses of these block copolymers are generally from 1000 to 15,000 g/mol, and the proportion of ethylene oxide is generally from 2 to 90% by weight, preferably from 5 to 85% by weight. It is moreover possible to use products having a central block of polyethylene glycol (Y—X—Y). In this case the proportion of polyethylene glycol is usually from 5 to 80% by weight, preferably from 7.5 to 75% by weight, and the molar masses are generally from 1000 to 15,000 g/mol. The molar masses (number-average) of these compounds are determined from the OH number in accordance with DIN 53240.

Particularly preferred additives F) are inorganic or organic transesterification inhibitors, from 0.01 to 5% by weight of which, preferably from 0.05 to 2% by weight, may be present in the novel molding compositions.

Suitable organic phosphonites have the formula

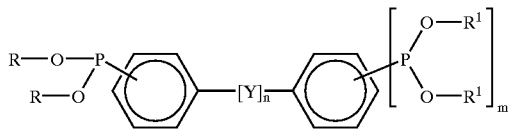

where
m is 0 or 1,
n is 0 or 1,
Y is an oxygen bridge, a sulfur bridge or a 1,4-phenylene bridge, or a bridging unit of the formula —CH($R^2$)—;
each of the R—O— and $R^1$—O— groups, independently of one another, is the radical of an aliphatic, alicyclic or aromatic alcohol which may contain up to three hydroxyl groups, but excluding any arrangement of the hydroxyl groups which permits these to be part of a phosphorus-containing ring (termed monovalent R—O— groups), or two R—O— or, respectively, $R^1$—O— groups, bonded to a phosphorus atom, in each case independently of one another, together are the radical of an aliphatic, alicyclic or aromatic alcohol having a total of up to three hydroxyl groups (termed bivalent R—O—, or, respectively, $R^1$—O— groups),
$R^2$ is hydrogen, $C_1$–$C_8$-alkyl or a group of the formula $COOR^3$, and
$R^3$ is $C_{1-8}$-alkyl.

It is preferable for at least one R—O and at least one $R^1$—O group to be a phenol radical which carries a sterically hindered group, in particular t-butyl, in the 2 position.

Particular preference is given to tetrakis(2,4-di-tert-butylphenyl) biphenylenediphosphonite, which is available commercially from Ciba Geigy AG as Irgaphos® PEPQ.

Preferred embodiments and process for preparing compounds of this type can be found in DE-A-40 01 397.

Suitable inorganic transesterification stabilizers are described, for example, in U.S. Pat. No. 5,674,928. Particularly suitable compounds which may be mentioned are acid salts of phosphoric acid, e.g. monozinc phosphate, calcium dihydrogen phosphate, sodium dihydrogen phosphate and potassium dihydrogen phosphate. It is also possible to use phosphates, e.g. zinc phosphate or copper phosphate. Other metal phosphates with metals of the first or second transition group are also suitable. Use may also be made of P-containing acids, e.g. phosphoric acid, phosphorous acid, polyphosphorous acid or hypophosphoric acid. Examples of suitable compounds are $Na_3HP_2O_7$, $K_2H_2P_2O_7$, $KaH_2P_2O_7$ and $Na_2H_2P_2O_7$.

The novel thermoplastic molding compositions may be prepared by processes known per se, by mixing the starting components in customary mixing equipment, such as screw extruders, Brabender mixers or Banbury mixers, followed by extrusion. The extrudate may be cooled and comminuted. It is also possible to premix individual components and then to add the remaining starting materials, individually and/or likewise mixed. The mixing is generally carried at from 230 to 290° C.

In a preferred method of operation, components B) to E), and also, if desired, customary additives F), may be mixed with a polyester prepolymer, compounded and pelletized. The resultant pellets are then condensed in the solid phase under an inert gas, continuously or batchwise, at below the melting point of component A) until the desired viscosity has been obtained.

The novel thermoplastic molding compositions feature a good combination of stability in long-term service, toughness, flowability and melt stability. They are suitable for producing fibers, films or moldings, in particular for applications in the motor vehicle sector or the electronics sector, or else as household items or devices in medical technology.

EXAMPLES

Component A:
Polybutylene terephthalate with a viscosity number of 130 ml/g and with a carboxyl end group content of 34 mval/kg (Ultradur® B 4500 from BASF AG) (VN measured in a 0.5% strength solution made with a 1:1 mixture of phenyl and o-dichlorobenzene, at 25° C. to ISO 1628).

Component B:
Polycarbonate based on bisphenol A, e.g. Lexan® 161 from General Electric, characterized by a viscosity number of 61 ml/g (measured in 0.5% strength by weight $CH_2Cl_2$ solution at 23° C.).

C/1 A fine-particle graft polymer prepared from
$\gamma_1$) 16 g of butyl acrylate and 0.4 g of tricyclodecenyl acrylate, which were heated to 60° C. in 150 g of water, with stirring, with addition of 1 g of the sodium salt of a $C_{12}$–$C_{18}$ paraffinsulfonic acid, 0.3 g of potassium persulfate, 0.3 g of sodium hydrogen carbonate and 0.15 g of sodium pyrophosphate. Beginning 10 minutes after the polymerization reaction had begun, a mixture made from 82 g of butyl acrylate and 1.6 g of tricyclodecenyl acrylate was added within a period of 3 hours. After monomer addition had finished, stirring was continued for a further hour. The resultant latex of the crosslinked butyl acrylate polymer had a solids content of 40% by weight, and its average particle size (weight average) was determined as 76 mm. The particle size distribution was narrow (quotient Q=0.29).

$\gamma_2$) 150 g of the polybutyl acrylate latex obtained in $\gamma_1$) were mixed with 40 g of a mixture made from styrene and acrylonitrile (weight ratio 75:25) and 60 g of water, and heated at 65° C. for 4 hours, with stirring, after adding a further 0.03 g of potassium persulfate and 0.05 g of lauroyl peroxide. After the graft polymerization had finished, the polymerization product was precipitated from the dispersion using calcium chloride solution at 95° C., washed with water and dried in a stream of hot air. The degree of grafting of the graft copolymer was 35°, and the particle size was 91 nm.

C/2 A coarse-particle graft polymer prepared as follows:
$\gamma_3$) 50 g of water and 0.1 g of potassium persulfate were added to 1.5 g of the latex prepared as in $\gamma_1$), and then the following were added during the course of 3 hours at 60° C.: on the one hand a mixture of 49 g of butyl acrylate and 1 g of tricyclodecenyl acrylate, and on the other hand a solution of 0.5 g of the sodium salt of a $C_{12}$–$C_{18}$ paraffinsulfonic acid in 25 g of water. Polymerization was then continued for 2 hours. A resultant latex of the crosslinked butyl acrylate polymer had a solids content of 40%. The average particle size (weight average) of the latex was determined as 430 nm. The particle size distribution was narrow (Q=0.1).

$\gamma_4$) 150 g of the latex prepared as in $\gamma_1$) were mixed with 20 g of styrene and 60 g of water and heated for 3 hours at 65° C., with stirring, after adding a further 0.03 g of potassium persulfate and 0.05 g of lauroyl peroxide. The dispersion obtained in this graft copolymerization was then polymerized with 20 g of a mixture of styrene and acrylonitrile in a weight ratio of 75:25 for a further 4 hours. The reaction product was then precipitated from the dispersion using a calcium chloride solution at 95° C., washed with water and dried in a stream of hot air. The degree of grafting of the graft copolymer was determined as 35%. The average particle size of the latex particles was 510 nm.)

D) A copolymer made from styrene and acrylonitrile in a weight ratio of 80:20 with a viscosity number of 83 ml/g (measured in a 0.5% strength by weight solution in dimethylformamide at 23° C.), prepared by continuous solution polymerization by a process as described, for example, in Kunststoff-Handbuch, Vieweg-Daumiller, vol. V (Polystyrol), Carl-Hanser-Verlag, Munich 1969, p. 124, lines 12 et seq.

Component E

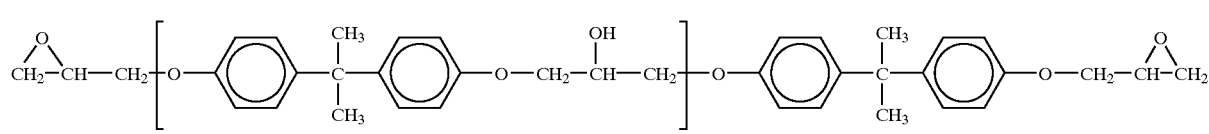

Epoxy number from 1.68 to 1.75 eq/kg

Component F/1

Glass fibers with an epoxysilane size

Component F/2

Irgaphos®PEPQ from Ciba Geigy Spezialitätenchemie GmbH (tetrakis(2,4-di-tert-butylphenyl) 4,4'-diphenylenediphosphonite)

Preparation and testing of the molding compositions Components A) to F) were mixed using a twin-screw extruder (barrel at 250° C.). The melt was passed through a water bath and pelletized. The test specimens were produced at a melt temperature of 260° C.

The mechanical properties were also tested on injection-molded specimens (melt at 260° C., mold at 80° C.). The HDT B heat distortion temperature was determined. The impact strength of the products as determined on ISO specimens to ISO 179 1 eU. To characterize heat resistance, tensile specimens and ISO specimens were stored for 500 h at 120° C. Specimens were removed after 100, 250 and 500 h for testing (tensile test to ISO 527 and impact strength test to ISO 179 1 eU).

Table 1 lists the makeups of the molding compositions and the results of the tests.

TABLE 1

| Example Components in % by weight | c1 | 1 | c2 | 2 | c3 | 3 |
|---|---|---|---|---|---|---|
| A | 58 | 57.3 | 58 | 57.3 | 47.8 | 47.2 |
| B | — | — | — | — | 10 | 9.9 |
| C1 | 5.5 | 5.4 | 2.5 | 2.4 | 5.5 | 5.4 |
| C2 | 5.5 | 5.4 | 2.5 | 2.4 | 5.5 | 5.4 |
| D | 11 | 10.9 | 17 | 16.9 | 11 | 10.9 |
| E | — | 1 | — | 1 | — | 1 |
| F1 | 20 | 20 | 20 | 20 | 20 | 20 |
| F2 | — | — | — | — | 0.2 | 0.2 |
| HDT B (° C.) | 210 | 209 | 213 | 211 | 197 | 196 |
| $a_n$ (kJ/m$^2$) | 52 | 55 | 52 | 53 | 64 | 67 |
| after 100 h | 48 | 51 | 38 | 41 | 57 | 62 |
| after 250 h | 44 | 50 | 37 | 40 | 52 | 61 |
| after 500 h | 43 | 49 | 35 | 40 | 47 | 60 |
| Ultimate tensile strength (MPa) | 104 | 105 | 115 | 116 | 100 | 101 |
| after 100 h | 105 | 104 | 114 | 117 | 98 | 99 |
| after 250 h | 104 | 104 | 113 | 117 | 97 | 98 |
| after 500 h | 104 | 104 | 113 | 117 | 97 | 98 | c: comparative experiments

We claim:

1. A thermoplastic molding composition comprising, as substantial components,
   A) from 2 to 97.9% by weight of at least one polyester,
   B) from 0 to 95.9% by weight of at least one polycarbonate,
   C) from 1 to 80% by weight of at least one graft polymer built, up from
      $c_1$) from 40 to 80% by weight of a graft base made from an elastomeric polymer based on alkyl acrylates having from 1 to 8 carbon atoms in the alkyl radical and with a glass transition temperature below 10° C.,
      $c_2$) from 20 to 60% by weight of a graft made from,
      $c_{21}$) from 60 to 95% by weight of styrene or substituted styrenes of the formula I

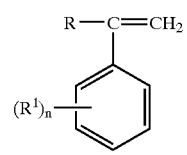

where R is alkyl having from 1 to 8 carbon atoms or hydrogen and R$^1$ is alkyl having from 1 to 8 carbon atoms and n is 1, 2 or 3, and
      $c_{22}$) from 5 to 40% by weight of at least one unsaturated nitrile,
   D) from 1 to 80% by weight of a rubber-free copolymer consisting essentially of,
      $d_1$) from 60 to 95% by weight of styrene or of substituted styrenes of the formula I or mixtures of these, and
      $d_2$) from 5 to 40% by weight of at least one unsaturated nitrile,
   E) from 0.1 to 10% by weight of an epoxy resin, and
   F) from 0 to 80% by weight of other additives, where the total of the percentages by weight of components A) to F) is 100%.

2. A thermoplastic molding composition as claimed in claim 1, comprising, as component A) at least one polyalkylene terephthalate having from 2 to 10 carbon atoms in the alcohol moiety.

3. A thermoplastic molding composition as claimed in claim 1, in which component E) is composed of compounds of the formula II

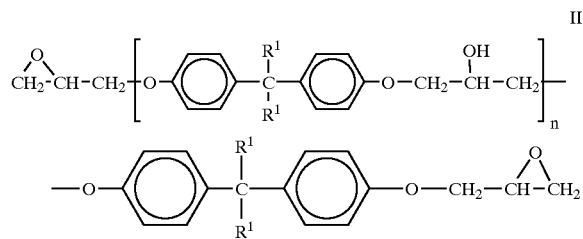

where

R¹ is a hydrogen or alkyl having from 1 to 16 carbon atoms and n is from 2 to 50.

4. A thermoplastic molding composition as claimed in claim 1, in which component E) has an epoxy number to ISO 3001 of from 1.5 to 1.9.

5. A molding, film or fiber obtainable from the molding compositions as claimed in claim 1.

6. The molding composition defined in claim 4, in which the epoxy number is of from 1.68 to 1.75.

7. A thermoplastic molding composition as claimed in claim 1, in which component E) has a softening point to DIN 51920 of from 75 to 100° C.

8. The molding composition defined in claim 7, in which the softening point is of from 82 to 90° C.

9. A thermoplastic molding composition as claimed in claim 1, in which component E) has a melt viscosity to DIN 53018 Part 1 at 175° C. of from 250 to 600 mPas.

10. The molding composition defined in claim 9, in which the melt viscosity is of from 350 to 480 mPas.

* * * * *